Patented Mar. 24, 1942

2,277,152

UNITED STATES PATENT OFFICE 2,277,152

PREPARATION OF POLYAMIDES

Paul Schlack, Berlin-Treptow, Germany, assignor, by mesne assignments, to E. I. du Pont de Nemours and Company, Wilmington, Del.

No Drawing. Application December 7, 1939, Serial No. 307,984. In Germany December 8, 1938

3 Claims. (Cl. 260—78)

This invention relates to the production of synthetic linear polyamides. By heating ω-aminocarboxylic acids having a carbon chain of at least five atoms between the amino group and the carboxylic acid group, or functional derivatives of such acids for instance esters, to polyamide forming temperatures, condensation to fusible or soluble polymeric anhydride-compounds is brought about. It is possible to obtain such a high degree of polymerisation that the reaction products may be formed into valuable articles, especially threads. Similar products also with excellent properties are obtained by heating lactams with at least seven ring members according to the process described in my prior U. S. patent applications Ser. Nos. 306,429, filed Nov. 27, 1939, corresponding to the German application I. 63,039 IVd/120 filed November 28, 1938, and 220,266 filed July 20, 1938, Patent No. 2,241,321. The polymerisation of lactams is preferably conducted in the presence of accelerating and reaction controlling agents such as water and alcohol and/or salts of amines or aminocarboxylic acids or combinations of these agents.

It is an object of the invention to provide a process of polymerizing aminocarboxylic acids.

A further object of the invention consists in the provision of a process of polymerizing aminocarboxylic acids in a form in which they are readily isolated from mixtures.

Further objects of the invention will appear from the following detailed description.

I have found that synthetic linear polyamides of great value are obtained by employing for the condensation substitution products of aminocarboxylic acids or of derivatives of aminocarboxylic acids including the chlorides and the lactams in which the amino or imino group is acylated by a carboxylic acid, which either as such or in the form of derivatives or decomposition products which are formed during the reaction are volatile at the reaction temperature, if necessary at reduced pressure, or which are transformed during the reaction into harmless indifferent compounds. In the case of acylated lactams, for instance N-acyl-ε-caprolactams other volatile compounds, capable of being acylated, such as water, alcohol, phenol, ammonia, or amines should be present. If the acyl compound is to be heated in the form of the free acids without any further additions, acyl radicals of acids, which boil without decomposition at temperatures above 180° C. should not be present.

Aminocarboxylic acids suitable for the process of this invention or lactams are for instance ε-aminocaproic acid, 9-aminononanoic acid, 11-aminoundecanoic acid, ε-amino-n-amyl-γ-thiobutyric acid, obtainable as the formyl compound from ε-formylamino amylmercaptan and γ-chlorobutyric acid, ε-caprolactam, ε-aminocapric acid lactam which may be substituted by radicals of formic acid, acetic acid, propionic acid, butyric acid or of trimethyl acetic acid. Of these acids the last has the advantage of being partly decomposed at polyamide-forming temperatures to isobutylene, that is it is decarboxylated. Other acids which split off carbon dioxide under the reaction condition are malonic acid, p-hydroxybenzoic acid, dihydroxybenzoic acid. The phenols which are obtained in the latter case may remain in the reaction mixture. Formic acid is especially important by which amino acids are formulated very easily and already at relatively low temperatures.

A special advantage of the process consists in the fact that the amino acids are easily separable from complex mixtures in the form of their acyl compounds, especially in the case of the formyl compounds. In the latter case it is sufficient to heat the aminoacid or the mixture containing the amino acid with formic acid of 98–100% strength, if necessary in the presence of a condensing agent, such as phthalic acid anhydride or a liquid which forms an azeotropic mixture with water and finally isolating the amino acid by distilling off, if desired after previous filtration. If necessary the formylamino acid may be separated from the residue by an indifferent solvent for instance acetone or alcohol. By heating mixtures of amino acids and formamide or chloral, formylamino acids may be obtained.

Besides the formyl compounds the acetyl compounds are easily accessible. The acetylation may be carried out with the aid of acetic anhydride or mixtures of acetic acid and acetic acid anhydride in the heat, as well as by shaking the aqueous solution of the amino acid with acetic acid anhydride in the presence of sodium bicarbonate, soda or sodium acetate, or by introducing vapours containing ketene into the alkaline solution of the acids. The acyllactams are easily accessible by reacting the lactams with acylating agents for instance acid chlorides in indifferent solvents.

The formation of the polymers by heating is facilitated and controlled by adding primarily alkaline compounds such as magnesium oxide, alkali acetate, high boiling tertiary bases like dimethyloctadecylamine or dodecylguanidine or acid compounds such as hydrogen chloride, zinc chloride, toluenesulfonic acid, camphorsulfonic acid, phosphoric acid, perchloric acid, salts of amines and amino acids with strong bases. It is furthermore favorable to pass an indifferent gas such as carbonic acid or nitrogen or of indifferent organic vapours such as benzene or ester forming solvents such as methanol or ethanol or of steam through the melt. In order to produce light or colorless products it is necessary to keep off oxygen, although the formylamino acids tend comparatively little to the formation of oxydative discoloration.

The conversion may be conducted in the presence of high boiling solvents such as for instance O-chlorophenol, m-cresol, or xylenol.

In most cases a specially satisfactory working manner consists in heating the acylamino acids or acyllactams at first in the presence of water or alcohol or ammonia or amines under pressure and then heating until the monomeric reactants especially the lactams which have been present from the start or which have been formed during the reaction have for the most part disappeared and then removing the volatile reaction products by reducing the pressure. Subsequently heating under atmospheric pressure or under reduced pressure is continued.

In the case of substances containing the radicals of relatively volatile acids for instance radicals of formic acid or acetic acid, it is not necessary to work under reduced pressure at the end of the reaction.

Apart from the acylamino acids or acyllactams, compounds capable of condensation may be present, which on the one end possess amino groups or acylamino groups on the other end carboxylic acid groups or substituted carboxylic acid groups capable of condensation, such as ester or amino groups, for instance simple $\omega$-aminocarboxylic acids or their esters, salts or $\alpha\omega$-diamines and $\alpha\omega$-dicarboxylic acids as well as any desired linear condensation products, still containing amino and carboxyl groups for instance the lower or medium condensation products of $\omega$-aminocarboxylic acids with at least 6 carbon atoms in the straight carbon chain. Such compounds may advantageously be added during the second phase of the condensation. The renewed development of gases and vapors thus produced facilitates the removal of decomposition products of the acylamino compounds.

A subsequent addition of non-lactam-forming amino acids for instance $\delta$-aminoheptanoic acid effects stabilization.

As against the known process of simple condensation of amino acids described for instance in U. S. Patent No. 2,071,253 the new process has several important advantages:

Firstly the starting materials are much more simply prepared in pure form as the amphoteric amino acids, which are difficult to separate from accessories especially salts by recrystallization. Furthermore it is very advantageous, that the acylamino acids and still more the acylated lactams possess a relatively low melting point, so that a homogeneous easily stirrable mass is obtained when the reaction sets in.

The acylated lactams may also be very easily obtained in a pure state from crude mixtures, so that the working up of very crude mixtures of lactams or the working up of distillation residues of lactams for acyllactams offers technical and economical advantages.

The good stability of the products in the melt is also noteworthy as well as their little tendency for oxidation when heated. This applies especially to such products which are obtained wholly or partly from acyllactams with acyl radicals which are stable against heat for instance for such products in which the acyllactams have been added later to the reaction mass.

The smooth formation of products of high molecular weight without a decomposition of the acyl compounds is surprising. It was to be feared that decomposition and side-reactions would result, caused by the sometimes necessary intensified reaction conditions.

Example 1

1 mol formyl-$\delta$-aminocaproic acid (melting point 93° C.) produced by boiling the crude amino acid containing some hydrochloride with a surplus of formic acid of 98 per cent strength, distilling off the formic acid and recrystallizing from a little alcohol, is melted at 200° C., the temperature raised in the course of an hour to 220° C., then further to 250 to 260°. After heating 6 hours altogether in a stream of nitrogen the condensation is finished. The colorless opaque reaction product may be spun into good threads.

Example 2

1 mol acetylaminocaproic acid (melting point 102° C.) is heated in a shallow vessel in the presence of $\frac{1}{400}$ mol hexamethylenediamine first one hour to 200° C., then eight hours to 110° C. The polymer formed by splitting off the acetic acid resembles that of Example 1.

Example 3

1 mol benzoyl-$\epsilon$-caprolactam produced by boiling equimolecular proportions of benzoylchloride and $\epsilon$-caprolactam in benzene until the hydrogen chloride development has ceased, is heated in the presence of $\frac{1}{200}$ mol naphthalenesulfonic acid and 1.5 mol methanol three hours under pressure to 220–230° C. After the surplus of methanol has blown off the benzoic acid ester is steam distilled whereafter the product is finally heated for three hours to 250–260° C. The product may be worked into elastic shaped articles.

Example 4

1 mol benzoyl-6-aminocaproic acid methylester obtained by boiling the esterchlorohydrate in benzene with the equivalent amount of benzoylchloride is heated with 1 mol methanol and $\frac{1}{400}$ mol magnesium butylate in a closed autoclave three hours at 200–250° C. The methanol is blown off and the benzoic acid methylester formed is removed in an oil pump vacuum. Finally the product is heated for 6 hours to 260° C. The reaction product can be spun into threads.

Example 5

1 mol benzoyl-$\epsilon$-aminocaproic acid is heated in the presence of $\frac{1}{200}$ mol $\epsilon$-aminocaproic acid hydrochloride for 4 hours under reduced pressure (10 mm.) to 220–230° C., whereat one part of the liberated benzoic acid distills off. Then overheated steam is passed through the melt at 230° C. until no further benzoic acid passes over, which state is reached after about two hours. The product is then heated for five hours to 245–260° C. in a stream of nitrogen at atmospheric pressure. The reaction product can be spun into threads.

It is also possible to heat the acid in the presence of water for two hours to 220° C. under pressure, then blowing off the water and benzoic acid vapor and then removing the residual benzoic acid as above by introducing overheated steam.

Example 6

Equimolecular proportions of ε-caprolactam and γ-chlorobutyric acid-chloride are dissolved in two parts of benzene and boiled until hydrogen chloride development ceases. The mass remaining after the benzene is distilled off, is dissolved in five parts of alcohol, and an equimolecular proportion of potassium formate added and boiled until no further potassium chloride separates. After filtration a small surplus of potassium is added and the mixture left standing until it is completely water-soluble. After adding an amount of hydrogen chloride calculated on the potassium hydroxide, the mass is evaporated, the residue separated from the organic salt and concentrated. The hydroxyacid obtained is heated for one hour to 200–210° C. then for 5 hours to 240–260° C., the water and butyrolacton being distilled off. The light colored polymer can be spun into threads having high affinity for acid dyes.

Example 7

1 mol formyl-ε-amino-N-caproic acid is heated in a stream of nitrogen for one hour to 200–240° C. and then the melt is pressed by means of nitrogen pressure into a vessel containing $\frac{1}{10}$ mol of hexamethylenediammonium adipate. After stirring the mixture is further heated to 240° C. under pressure then another three hours to 260–275° C. without pressure under nitrogen. A colorless spinnable product of high stability is obtained.

Example 8

A mixture of 4 mols caprolactam and one mol acetylcaprolactam prepared by boiling ε-caprolactam and acetyl-bromide until the hydrogen bromide development ceases, is melted together with two mols water and $\frac{1}{60}$ mol ε-aminocaproic acid hydrochloride. The mixture is then heated first for 1 hour to 200° C., in the autoclave the temperature is then raised within an hour to 240° C. the pressure released and the product heated for another 6 hours to 250–255° C. under nitrogen. The product obtained is colorless and well spinnable.

Example 9

1 mol formyl-ε-aminocaproic acid amide produced from the acid by careful chlorination with thionylchloride and reacting with ammonia is heated in the presence of 1.2 mol water first 2.5 hours to 200–220° C. in the autoclave. After releasing the pressure it is heated another four hours to 255° C. The product resembles that of Example 1 and can be spun into good threads.

Example 10

Formyl-ε-aminoheptanoic acid is heated in two parts of xylenol first one hour in a closed vessel at 220° C., then after distilling off the water for eight hours at the boiling point of the xylenol. The reaction product is precipitated by stirring the xylenol solution into cold alcohol as a fluffy powder. After melting together at 240° C. the product is spinnable.

I claim:

1. A process of producing highly polymeric linear polyamides, which comprises heating at polyamide-forming temperatures a N-acyl-derivative of a substance selected from the class consisting of a monoaminomonocarboxylic acid, the esters, lactams, chlorides and amides of said acid, the chain between the amino and carboxyl groups in said acid having at least 5 carbon atoms and being free from reactive groups, the acyl radical in said N-acyl derivative being that derived by removal of the hydroxyl group from a carboxylic acid.

2. A process of producing highly polymeric linear polyamides, which comprises heating at polyamide-forming temperatures a N-acyl derivative of a substance selected from the class consisting of a monoaminomonocarboxylic acid, the esters, lactams, chlorides and amides of said acid, the chain between the amino and carboxyl groups in said acid having at least 5 carbon atoms and being free from reactive groups, the acyl radical in said N-acyl derivative being derived by removal of the hydroxyl group from a carboxylic acid having a boiling point below 180° C.

3. A process of producing highly polymeric polyamides, which comprises heating at polyamide-forming temperatures a N-formyl-derivative of a substance selected from the class consisting of a monoaminomonocarboxylic acid, the esters, lactams, chlorides and amides of said acid, the chain between the amino and carboxyl groups in said acid having at least 5 carbon atoms and being free from reactive groups.

PAUL SCHLACK.